(12) United States Patent
Robins

(10) Patent No.: US 11,859,692 B2
(45) Date of Patent: Jan. 2, 2024

(54) HOOK ASSEMBLY WITH CLOSURE SYSTEM

(71) Applicant: Terry K Robins, Minneapolis, KS (US)

(72) Inventor: Terry K Robins, Minneapolis, KS (US)

(*) Notice: Subject to any disclaimer, the term of this patent is extended or adjusted under 35 U.S.C. 154(b) by 0 days.

(21) Appl. No.: 17/691,443

(22) Filed: Mar. 10, 2022

(65) Prior Publication Data

US 2022/0290738 A1 Sep. 15, 2022

Related U.S. Application Data

(60) Provisional application No. 63/207,577, filed on Mar. 10, 2021.

(51) Int. Cl.
*F16G 15/06* (2006.01)

(52) U.S. Cl.
CPC .................................. *F16G 15/06* (2013.01)

(58) Field of Classification Search
CPC . F16G 15/06; B66C 1/36; F16B 45/02; Y10T 403/32893
See application file for complete search history.

(56) References Cited

U.S. PATENT DOCUMENTS

| | | | |
|---|---|---|---|
| 576,339 A | 2/1897 | Clayton | |
| 822,675 A * | 6/1906 | Liliger | B66C 1/36 294/82.23 |
| 876,333 A * | 1/1908 | Cook | F16G 15/06 278/96 |
| 876,829 A * | 1/1908 | Nelson | F16G 15/06 278/96 |
| 2,124,912 A * | 7/1938 | Ehmann | F16G 15/06 411/956 |
| 3,462,945 A * | 8/1969 | Barber | F16G 15/06 294/82.35 |
| 3,795,951 A | 3/1974 | Ratcliff | |
| 4,075,966 A * | 2/1978 | Bates | B63H 9/08 294/82.35 |
| 4,337,614 A * | 7/1982 | Briscoe | F16G 15/06 411/518 |

(Continued)

OTHER PUBLICATIONS

Weldable Grab Hook, ⅜" G70, www.boltonhooks.com/weld-on-products/, BoltOnHooks LLC, Westminster, MD, 2022.

(Continued)

*Primary Examiner* — Robert Sandy
*Assistant Examiner* — Rowland Do
(74) *Attorney, Agent, or Firm* — Jeffrey L. Thompson; Thompson Law, P.A.

(57) ABSTRACT

A hook assembly has a hook body with a shank portion and a free end portion defining a hook opening. The free end portion has a tip end with a through passage, and a key slot formed in the through passage. A removable pin is received in the through passage to substantially close an open side of the hook opening to retain items within the hook opening. The pin has a protrusion that mates with the key slot when the pin is rotated to a first position to allow the pin to be received in and removed from the through passage. The protrusion serves as a locking structure to prevent the pin from being removed from the through passage when the pin is rotated away from the first position. A spring retainer is arranged to keep the pin in its locked position.

17 Claims, 7 Drawing Sheets

(56) References Cited

U.S. PATENT DOCUMENTS

| | | | |
|---|---|---|---|
| 4,689,859 A | | 9/1987 | Hauser |
| 4,823,444 A | * | 4/1989 | Larsen ............... A47G 25/1478 |
| | | | 211/113 |
| 5,362,117 A | | 11/1994 | Bennett, Jr. |
| 6,023,927 A | * | 2/2000 | Epstein .................. F16G 15/06 |
| | | | 59/85 |
| 6,568,894 B2 | * | 5/2003 | Golden .................. F16B 21/12 |
| | | | 411/513 |
| D503,328 S | | 3/2005 | Catlett |
| 7,967,353 B2 | | 6/2011 | Robins |
| 9,004,557 B2 | | 4/2015 | Knox |
| 9,039,055 B1 | | 5/2015 | Robins |
| 10,145,408 B2 | | 12/2018 | MacArthur et al. |
| 10,458,460 B1 | * | 10/2019 | Fox ....................... F16B 45/021 |
| 2012/0073088 A1 | * | 3/2012 | Boeckman .............. F16B 21/16 |
| | | | 24/132 WL |
| 2013/0074469 A1 | * | 3/2013 | Robins ................... F16G 15/06 |
| | | | 59/86 |
| 2022/0136584 A1 | * | 5/2022 | Clarke ................... F16G 15/06 |
| | | | 59/86 |

OTHER PUBLICATIONS

Lynch Pin, 5/16"×1¾" Carbon Steel Zinc Yellow, www.huyett.com/products/fasteners/pins/lynch-pins, LP-312-1750, G.L. Huyett, Minneapolis, KS, 2022.

* cited by examiner

HOOK ASSEMBLY WITH CLOSURE SYSTEM

RELATED APPLICATIONS

This application claims the benefit of Applicant's U.S. Provisional Patent Application No. 63/207,577 filed on Mar. 10, 2021, the contents of which are incorporated herein by reference.

BACKGROUND OF THE INVENTION

Field of the Invention

The present invention relates generally to hooks for retaining a chain link, cable or similar element, and in particular, to a hook assembly having a closure system for ensuring that the chain link, cable or the like remains within an opening of the hook.

Description of the Related Art

Hooks are widely used to engage and retain chains by engaging one or more links thereof. Grab hooks with safety latches that can be moved between latching and unlatching positions to retain a chain link within the slot of the hook are described in Applicant's prior U.S. Pat. Nos. 7,967,353 and 9,039,055. The safety latch assemblies in these prior patents are designed primarily for use with grab hooks having a clevis-type attachment structure for attaching the hook body to a chain link using a pin member. The safety latch assemblies in these prior patents are not well suited for use with weld-on hooks.

Weld-on hooks are designed to be welded onto equipment to provide a quick and easy chain attachment point. Such weld-on hooks are available commercially from BoltOn-Hooks LLC, Westminster, Maryland, and are depicted, for example, at www.boltonhooks.com/weld-on-products/as "Weldable Grab Hooks."

Engagement of a chain link, cable or the like within a throat opening of a weld-on hook is a straightforward operation. However, retention of the chain link or cable in the slot of the hook may be thwarted in some instances by the chain link or cable disengaging or slipping out of the slot of the hook.

Lynch pins, also commonly referred to as linchpins or quick pins, are self-locking pins that are typically inserted crosswise through the end of an axle or shaft to keep objects from sliding off the axle or shaft. Lynch pins are often used to attach tractor implements, secure trailer couplers, hitch pins, and a variety of other applications where quick connecting/disconnecting between mating parts is desired. Lynch pins are available commercially from G. L. Huyett, Minneapolis, Kansas, and are depicted, for example, at www.huyett.com as "Lynch Pins."

There is a need for an improved hook assembly with a closure system for ensuring that the chain link, cable or the like remains within the hook opening of the hook body.

SUMMARY OF THE INVENTION

An object of the present invention is to provide a weld-on, clevis or eye type grab hook or slip hook with a closure system that can be closed to block access to the hook opening, thereby precluding debris or other material from entering the hook opening inadvertently.

A further object of the present invention is to provide a hook assembly having a closure system which is maintained in position by a spring biasing element and a locking structure.

A further object of the present invention is to provide a simple yet reliable latching mechanism for closing the throat or opening of a hook body of a hook assembly.

A further object of the present invention is to provide a weld-on hook assembly with a closure system for retaining an item within the opening of the hook assembly.

A further object of the present invention is to provide a closure system that uses a lynch pin having a protrusion mated with a key slot in passage through the hook body to provide a locking structure, and a spring retainer on the lynch pin serving to bias the lynch pin to a locked position.

To accomplish these and other objects of the invention, a hook assembly is provided, which has a hook body with a shank portion and a free end portion defining a hook opening. The hook body can be a weld-on, clevis or eye-type hook, and the hook opening can be an elongate slot to provide a grab hook, or a wide throat to provide a slip hook. In the case of a weld-on hook body, the shank portion has a weldable base. The free end portion has a tip end with a through passage having a key slot. A removable pin is received in the through passage to substantially close the open side of the hook opening to retain items within the slot. The pin has a protrusion that mates with the key slot when the pin is rotated to a first position to allow the pin to be received in the through passage. The protrusion serves as a locking structure to prevent the pin from being removed from the through passage when the pin is rotated away from the first position. The pin has a spring retainer arranged to bias the pin away from the first position.

According to one aspect of the invention, a hook assembly is provided, comprising: a hook body with a shank portion and a free end portion defining a hook opening for receiving an item to be engaged by the hook assembly, the shank portion comprising a base, and the free end portion comprising a tip end portion with a through passage. A removable pin assembly having a pin member is received in the through passage to substantially close an open side of the hook opening to retain items within the hook opening.

According to another aspect of the invention, a weld-on hook assembly is provided, comprising: a hook body having a shank portion and a free end portion disposed in a common plane and defining a hook opening for receiving an item to be engaged by the hook assembly. The shank portion has a weldable base to allow the hook assembly to be used as a weld-on attachment point. The free end portion of the hook body has a tip end portion with a through passage comprising a key slot. A removable pin assembly having a pin member is received in the through passage to substantially close an open side of the hook opening to retain items within the hook opening. The pin member comprises a protrusion that mates with the key slot when the pin member is rotated to a first position to allow the pin member to be received in and removed from the through passage. The protrusion serves as a locking structure that prevents the pin member from being removed from the through passage when the pin member is rotated away from the first position.

According to another aspect of the invention, a closure system is provided, comprising: a first element having a through passage with a key slot, and a removable lynch pin received in the through passage. The lynch pin includes a protrusion that mates with the key slot when the lynch pin is rotated to a first position to allow the lynch pin to be received in and removed from the through passage. The protrusion serves as a locking structure that prevents the lynch pin from being removed from the through passage when the lynch pin is rotated away from the first position. A spring retainer is connected to the lynch pin and arranged to bias the lynch pin to a rotational position away from the first position to prevent the lynch pin from being removed from the through passage.

Numerous other objects of the present invention will be apparent to those skilled in this art from the following description wherein there is shown and described embodiments of the present invention, simply by way of illustration of some of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

Figure 1:
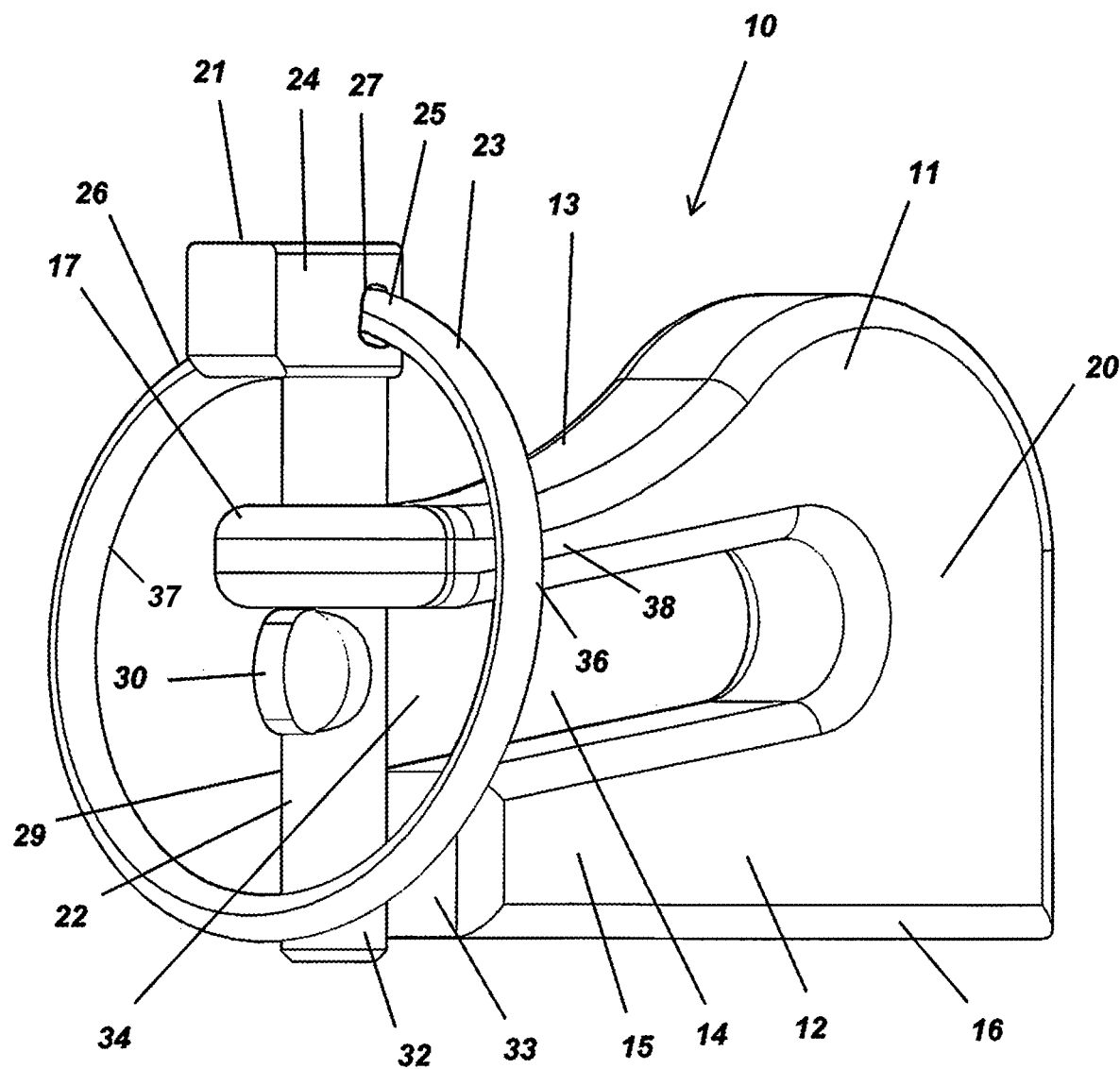
FIG. 1 is a perspective view of a weld-on grab hook assembly with a lynch pin in a closed position according to the present invention.

A hook assembly according to the present invention will now be described in detail with reference to FIGS. 1 to 7 of the accompanying drawings.

The hook assembly 10 includes a hook body 11 with a shank portion 12 and a free end portion 13 disposed in a common plane and defining a hook opening 14. The hook opening 14 can be used for receiving an item to be engaged by the hook assembly 10, such as a chain link, cable, or other similar item.

The shank portion 12 has a base 15 configured to be weldable to allow the hook assembly 10 to be used as a weld-on attachment point. The base 15 has at least one weldable chamfer edge 16 on a side opposite from the hook opening 14 to facilitate welding the hook body 11 to another structure S, such as a trailer frame, loader bucket or other piece of equipment.

The free end portion 13 of the hook body 11 has a tip end portion 17 that extends further from the hook opening 14 than the shank portion 12. The tip end portion 17 has a through passage 18 that extends generally perpendicular to the free end portion 13 of the hook body 11. The through passage 18 includes a key slot 19 along one side thereof. In the illustrated embodiment, the key slot 19 is formed on a side of the through passage 18 nearest to a closed end 20 of the hook body 11. This allows the key slot 19 to be formed without creating a weak spot in the structure of the tip end portion 17 surrounding the through passage 18.

A removable pin assembly 21 has a pin member 22 and a spring retainer 23. The pin member 22 in the illustrated embodiment is a lynch pin. The lynch pin 22 has a head 24, and the spring retainer 23 is a generally circular spring with offset ends 25, 26 received in respective openings 27, 28 in opposite sides of the head 24.

The lynch pin 22 has an elongate shaft 29 with a protrusion 30 on one side thereof. The elongate shaft 29 can be a cylindrical shaft, or a substantially cylindrical shaft with a flat side 31, as illustrated. The protrusion 30 protrudes generally perpendicular to a longitudinal axis of the lynch pin 22. The diameter of the shaft 29 of the pin member 22 and the size of the protrusion 30 are such that the lynch pin 22 can be inserted into the through passage 18 with the protrusion 30 mated with the key slot 19. The lynch pin 22 must be rotated to a first position of rotation with the protrusion 30 aligned with the key slot 19 (as depicted in FIGS. 3 to 6) to allow the lynch pin 22 to be received in and removed from the through passage 18.

The lynch pin 22 is received in the through passage 18 and extends through the passage 18 generally perpendicular to the shank portion 12 with an end portion 32 of the pin member 22 adjacent to an end face 33 of the shank portion 12. The lynch pin 22 substantially closes or blocks an open side 34 of the hook opening 14 when fully inserted into the through passage 18 to retain items within the hook opening 14. The protrusion 30 is arranged to abut a periphery 35 of the through passage 18 and serve as a locking structure that prevents the lynch pin 22 from being removed from the through passage 18 when the lynch pin 22 is rotated away from the first position.

Figure 2:
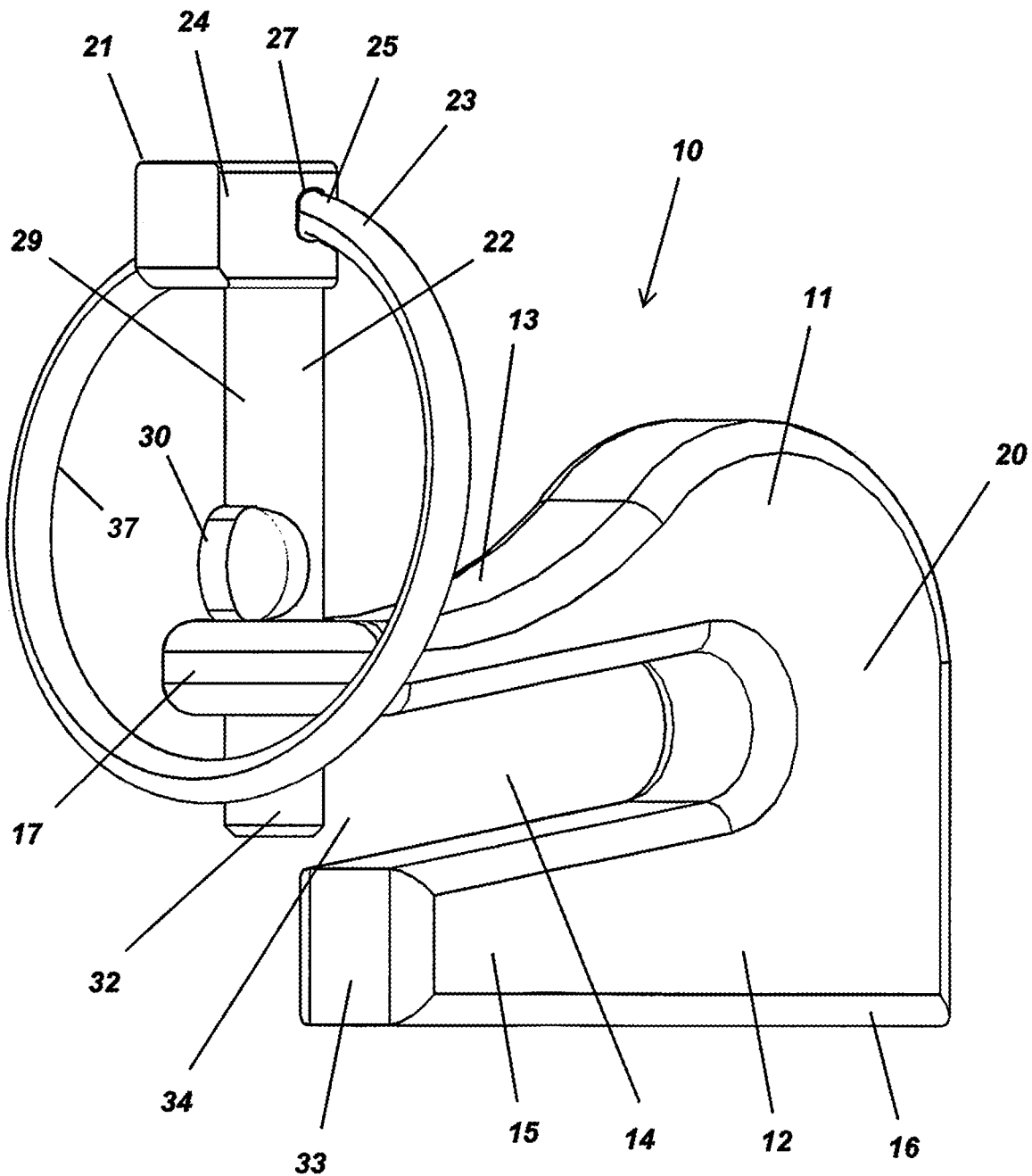
FIG. 2 is perspective view of the weld-on grab hook assembly with the lynch pin in an open position.
Figure 3:
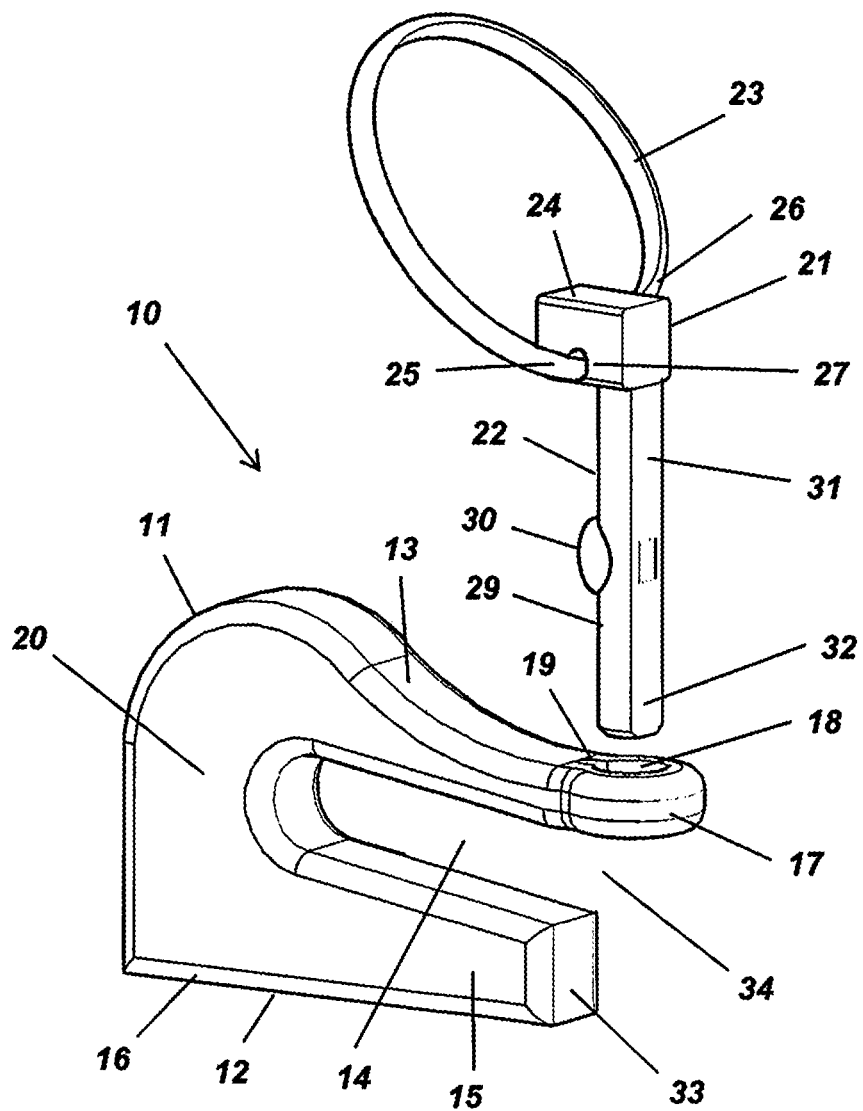
FIG. 3 is a perspective view of the weld-on grab hook assembly with the lynch pin removed from the hook body.
Figure 4:
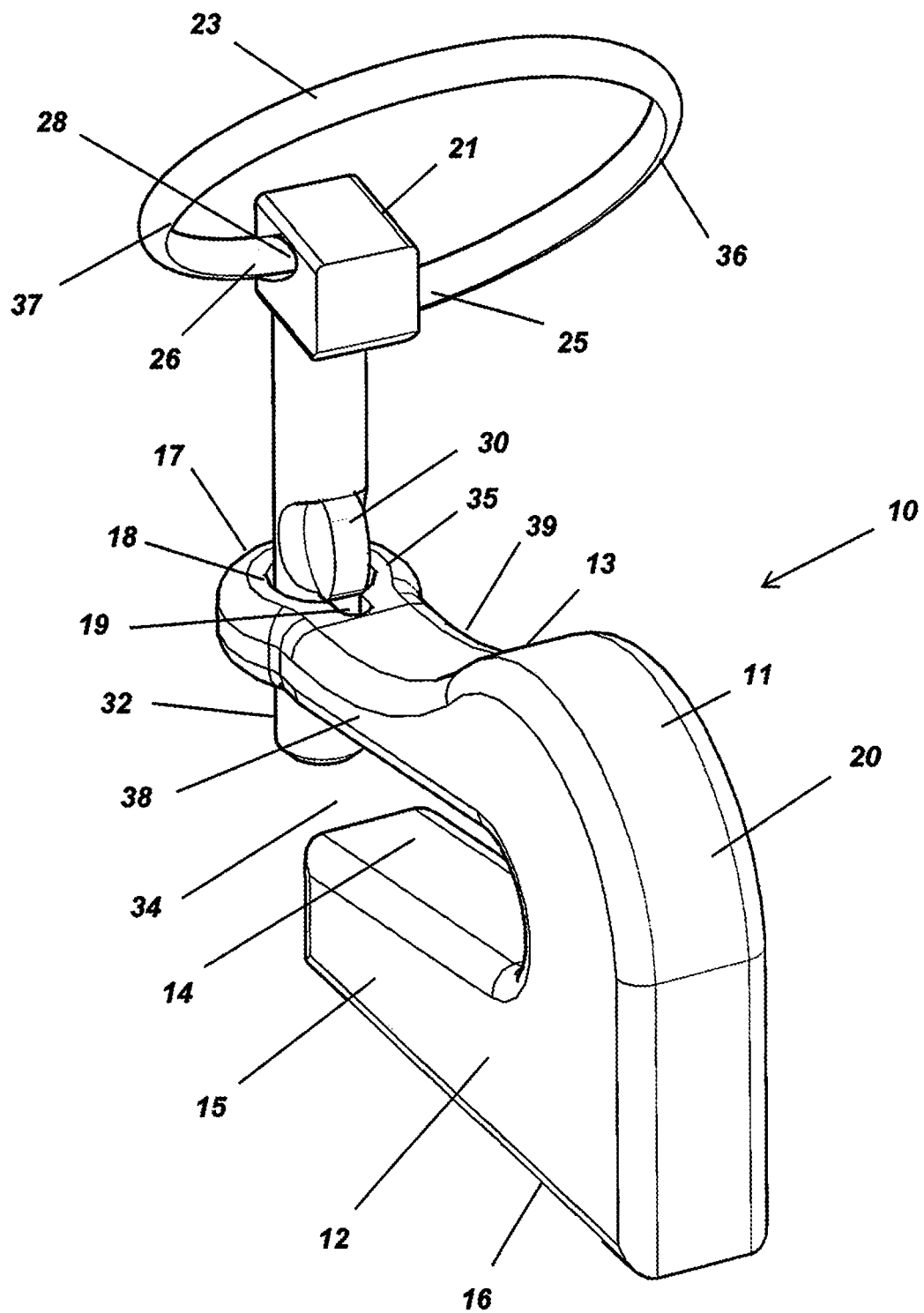
FIG. 4 is a perspective view of the weld-on grab hook assembly with the lynch pin ready to be inserted into the hook body.
Figure 5:
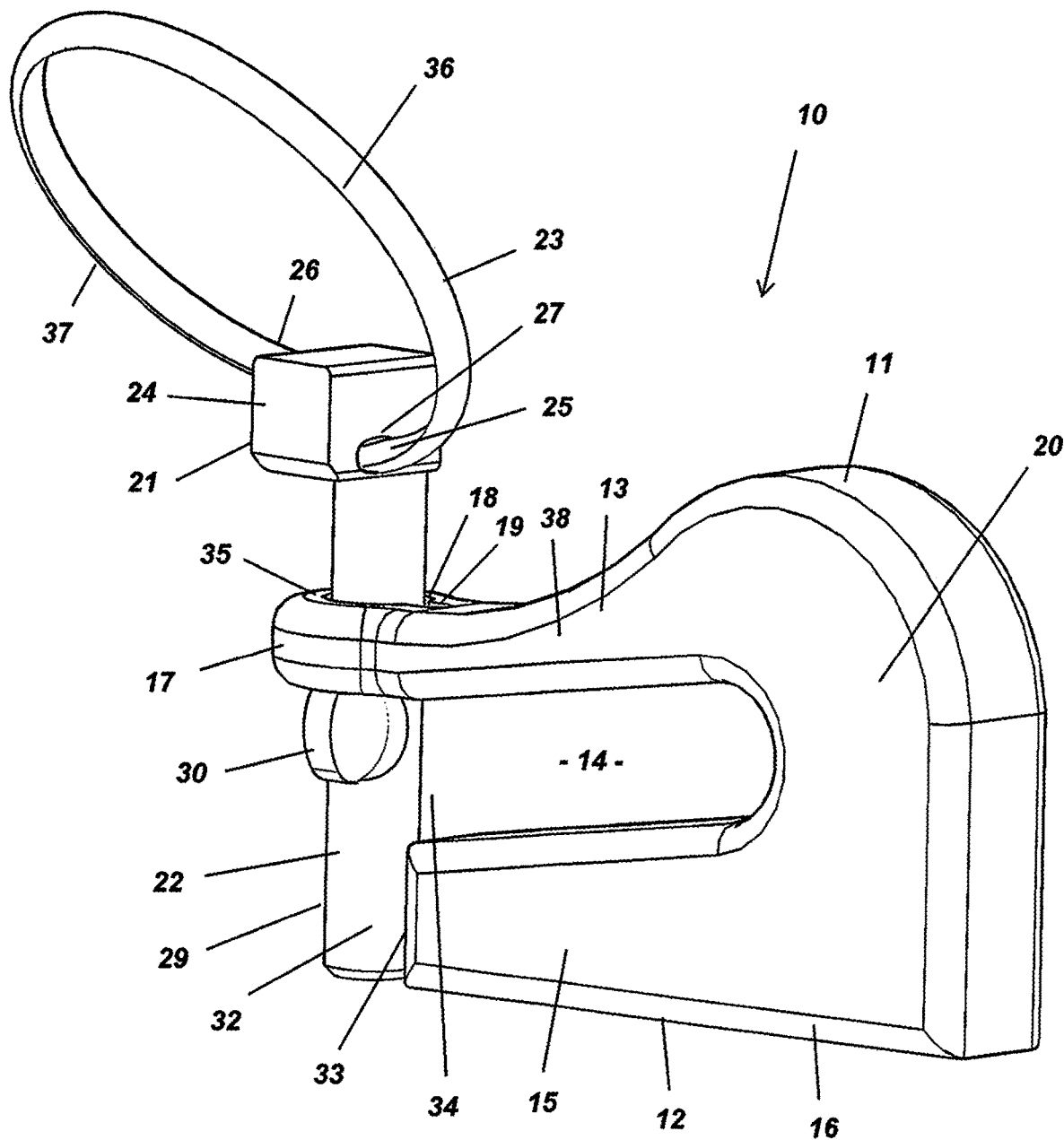
FIG. 5 is a perspective view of the weld-on grab hook assembly with the lynch pin being inserted into the hook body and prior to the spring retainer on the lynch pin being moved to its closed position.
Figure 6:
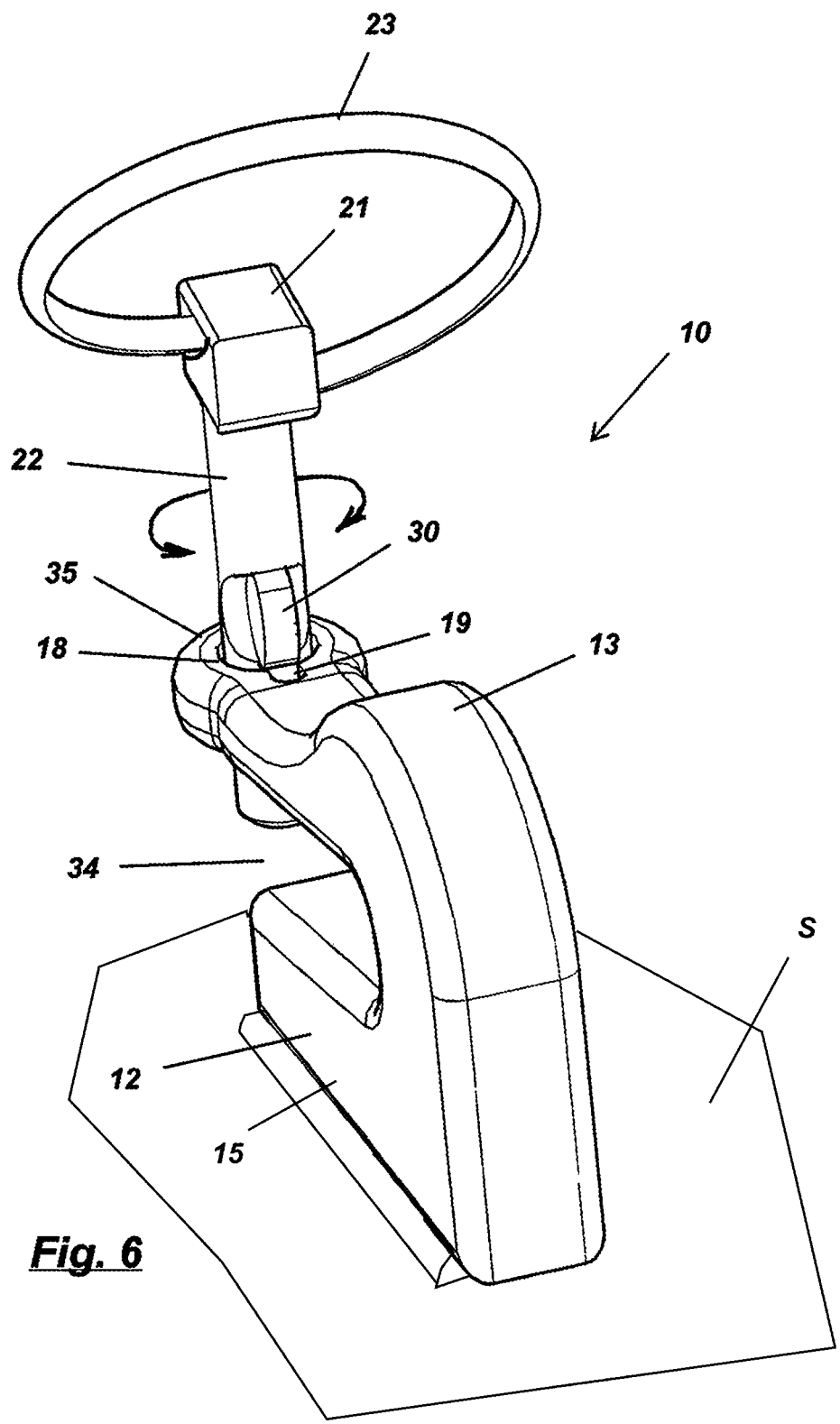
FIG. 6 is a perspective view of the weld-on grab hook assembly with the lynch pin in a partially inserted position in which it can be rotated to align a protrusion on the lynch pin with a key slot in the through passage.
Figure 7:
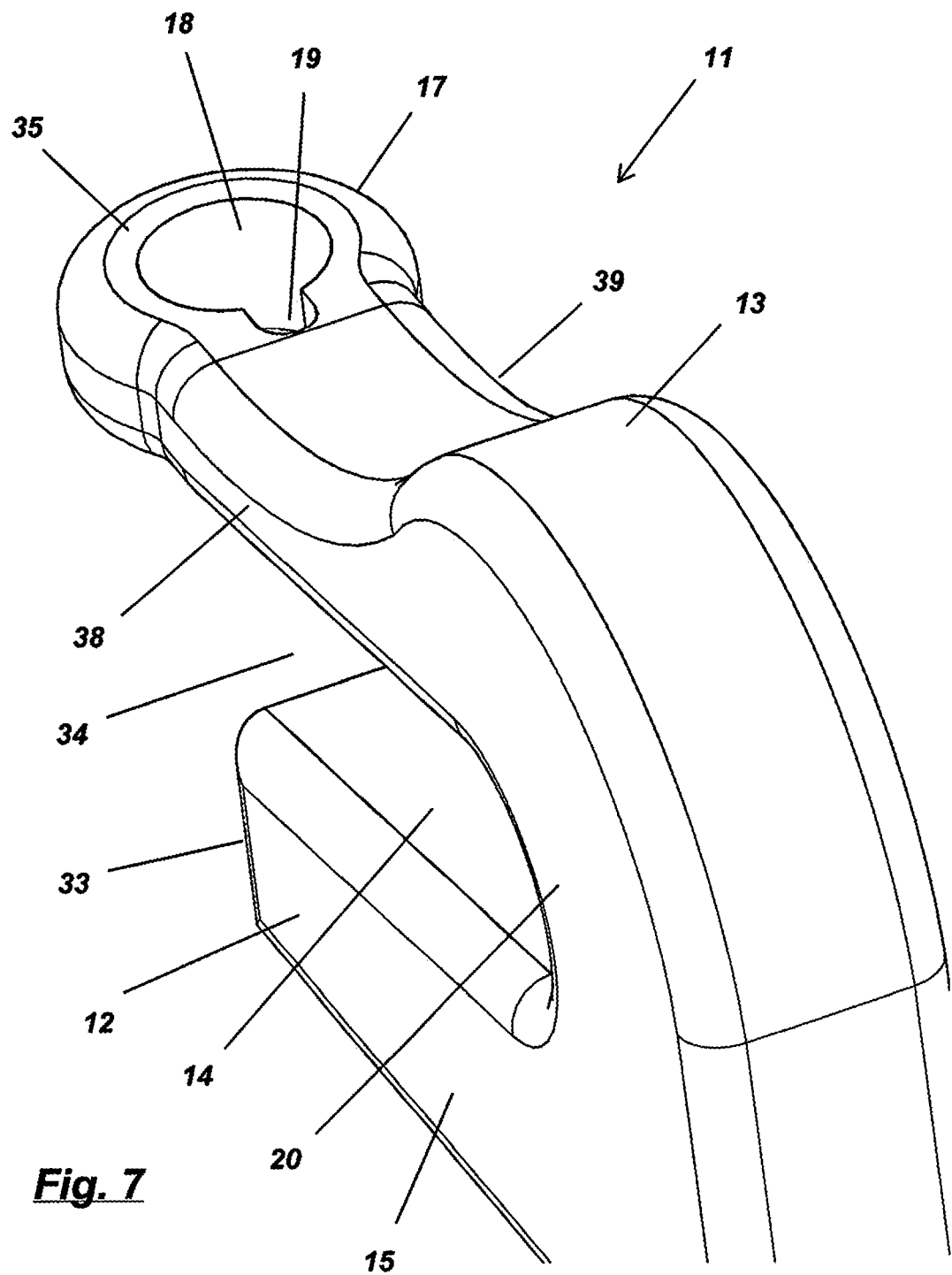
FIG. 7 is a perspective view showing the through passage in the tip end portion of the hook body of the weld-on grab hook assembly.

The spring retainer 23 of the pin assembly 21 has a first released position (i.e., spring retainer 23 extending away from the shaft 29 of the lynch pin 22, as depicted in FIGS. 3 to 6) in which the lynch pin 22 can be rotated freely within the through passage 18 when the lynch pin 22 is fully inserted (i.e., with the protrusion 30 past the key slot 19). The spring retainer 23 has a second closed position, as depicted in FIGS. 1 and 2, in which the spring retainer 23 is held by spring force against an outer surface of the shaft 29 of the lynch pin 22. In the second closed position, the spring retainer 23 has abutting portions 36, 37 arranged to abut respective sides 38, 39 of the free end portion 13 of the hook body 11 to prevent rotational movement of the lynch pin 22 to its first position with the protrusion 30 aligned with the key slot 19.

The spring retainer 23 in its second closed position is arranged to bias the lynch pin 22 to a rotational position away from the first position to prevent the lynch pin 22 from being removed from the through passage 18. The spring retainer 23 prevents the lynch pin 22 from being rotated to the first position, and thereby prevents the protrusion 30 on the lynch pin 22 from being aligned with the key slot 19 in the through passage 18. The protrusion 30 extends generally perpendicular to a plane containing the spring retainer 23 when the spring retainer 23 is in its second closed position.

The protrusion 30 on the lynch pin 22 and the key slot 19 in the through passage 18 provide a means for locking the pin assembly 21 in a position with the lynch pin 22 received in the through passage 18 substantially closes the open side 34 of the hook opening 14. Other means for locking the pin assembly 21 in such a position could also be used, including the use of a spring retainer without a separate mating locking structure, or the use of a spring biased detent protruding from the shaft of the lynch pin. In each case, the pin assembly 21 extends through the passage 18 to close the open side 34 of the hook assembly 10 and is reliably held in the closed position by a locking structure, a spring retainer, and/or a spring biased detent.

The hook assembly 10 of the present invention is illustrated in FIGS. 1 to 7 as a grab hook. The shank portion 12 and free end portion 13 of the hook body 11 in this embodiment define a hook opening 14 in the form of an elongate receiving slot having a narrow, straight-sided throat. Grab hooks are typically used to receive a single chain link in the hook opening 14, and the hook opening 14 is sufficiently narrow to prevent additional chain links from sliding through the opening 14. The chain links on either side of the engaged link of chain in the hook opening 14 prevent the chain from moving freely in the throat of the grab hook.

The hook assembly 10 of the present invention can also be used with various other types of hooks, such as slip hooks. In a slip hook, the shank portion and free end portion of the hook body define a hook opening with a wide throat that allows items retained in the hook opening to slide freely through the hook. A slip hook assembly having a tip end structure with a through passage and a removable pin assembly according to the present invention can be used to retain items within the hook opening of the slip hook assembly.

While the hook body 11 shown in FIGS. 1 to 7 is a weld-on type hook, it will be appreciated that features of the present invention can also be used with other types of hooks, such as clevis type hooks and eye type hooks.

The structure of the hook assembly 10 according to the present invention has been described above. A method of using the hook assembly 10 will now be described.

With the lynch pin 22 completely removed from the through passage 18 of the hook body 11, or partially withdrawn so that the end portion 32 of the lynch pin 22 does not extend into the hook opening 14, a chain, cable or other item to be retained can be inserted into the hook opening 14. Variations of this starting position can be used, including a position in which only the end portion 32 of the lynch pin is inserted into the through passage 18, and the spring retainer 23 is in its first closed position to hold the lynch pin 22 in place, as depicted in FIG. 2.

Once the item to be retained is inserted into the hook opening 14, the spring retainer 23 is moved into its first released position so that the lynch pin 22 can be rotated freely relative to the through passage 18. The lynch pin 22 is then rotated to its first position to align the protrusion 30 on the pin 22 with the key slot 19 in the through passage 18. The lynch pin 22 is then inserted into the through passage 18 until the end portion 32 of the lynch pin 22 is adjacent to the end face 33 of the shank portion 12 to substantially close the hook opening 14.

Once the lynch pin 22 is inserted far enough so that the protrusion 30 on the pin 22 is all the way through the key slot 19 in the through passage 18, the lynch pin 22 can then be rotated (e.g., approximately ¼ to ½ turn) in either direction, and then the spring retainer 23 moved to its second closed position (FIG. 1). In the second closed position, the spring retainer 23 allows only limited rotational movement of the lynch pin 22 (e.g., approximately 150 to 170 degrees) and prevents rotational movement of the lynch pin 22 back to its first position in which the protrusion 30 and key slot 19 would be aligned. The lynch pin 22 is thus held within the through passage 18 by a combination of the spring retainer 23 being spring tensioned into its second closed position, and the locking structure of the protrusion 30 and key slot 19 not being aligned.

The hook assembly 10 of the present invention allows a weld-on grab hook to be positioned with its hook opening 14 facing downwardly, and a chain link, cable or other item held within the hook opening 14 by the lynch pin 22 until the load above the grab hook is tied down. The lynch pin 22 in its fully inserted position (FIG. 1) prevents accidental dislodging of the chain from the hook opening 14 of the grab hook body 11 before the load is secured by chain binders or the like.

The lynch pin can 22 be removed easily from the hook body 11 by moving the spring retainer 23 to its first released position, rotating the lynch pin 22 until the protrusion 30 and key slot 19 are aligned, and sliding the lynch pin 22 out of the through passage 18.

The present invention can also be used with things other than hook assemblies. For example, elements of the present invention can be used to provide a closure system for door latches, tool boxes, and a variety of other items that use pin members to close, secure or retain the item. In this case, the closure system includes a first element having a through passage with a key slot, and a removable lynch pin received in the through passage.

The lynch pin has a protrusion that mates with the key slot when the lynch pin is rotated to a first position to allow the lynch pin to be received in and removed from the through passage. The protrusion serves as a locking structure to prevent the lynch pin from being removed from the through passage when the lynch pin is rotated away from the first position. A spring retainer is connected to the lynch pin and arranged to bias the lynch pin to a rotational position away from the first position to prevent the lynch pin from being removed from the through passage.

As in the other embodiments described above, the lynch pin has a head, and the spring retainer is a generally circular spring having offset ends received in respective openings in the head. The spring retainer has a first released position in which the lynch pin can be rotated freely within the through passage, and a second closed position in which an intermediate portion of the spring retainer is held by spring force against an outer surface of the lynch pin. The spring retainer also has abutting side portions arranged to abut respective sides of the first element to prevent rotational movement of the lynch pin to the first position.

While the invention has been described in connection with specific embodiments thereof, it is to be understood that this is by way of illustration and not of limitation, and the scope of the appended claims should be construed as broadly as the prior art will permit.

What is claimed is:

1. A hook assembly, comprising:
   a hook body with a shank portion and a free end portion defining a hook opening for receiving an item to be engaged by the hook assembly, said shank portion comprising a base, and said free end portion comprising a tip end portion with a through passage; and
   a removable pin assembly having a pin member received in said through passage to substantially close an open side of said hook opening to retain items within said hook opening;

wherein said removable pin assembly comprises a lynch pin with a spring retainer;

wherein said through passage comprises a key slot, and said lynch pin comprises a protrusion that mates with said key slot when the lynch pin is rotated to a first position to allow said lynch pin to be received in and removed from said through passage, and wherein said protrusion serves as a locking structure that prevents said lynch pin from being removed from said through passage when said lynch pin is rotated away from said first position;

wherein said spring retainer is arranged to bias said lynch pin to a rotational position away from said first position to prevent said lynch pin from being removed from said through passage; and wherein said lynch pin comprises a head, said spring retainer comprises a generally circular spring having offset ends received in respective openings in said head, and said spring retainer has a first released position in which the lynch pin can be rotated freely within the through passage, and a second closed position in which the spring retainer is held by spring force against an outer surface of the lynch pin and has abutting portions arranged to abut respective sides of the free end portion of the hook body to prevent rotational movement of the lynch pin to said first position.

2. The hook assembly according to claim 1, wherein said base of the shank portion of the hook body is weldable to allow the hook assembly to be used as a weld-on attachment point.

3. The hook assembly according to claim 1, wherein said tip end portion extends further from said hook opening than said shank portion, and wherein said pin member extends through said passage generally perpendicular to said shank portion with an end portion of said pin member adjacent to an end face of said shank portion.

4. The hook assembly according to claim 1, wherein said protrusion on said lynch pin is arranged to abut a periphery of the through passage in the tip end portion of the hook body when serving as a locking structure to prevent the lynch pin from being removed from said through passage when the lynch pin is rotated away from said first position.

5. The hook assembly according to claim 4, wherein said protrusion on said lynch pin protrudes generally perpendicular to an axis of said lynch pin and generally perpendicular to a plane containing said spring retainer when the spring retainer is in its second closed position.

6. The hook assembly according to claim 5, wherein said key slot is formed on a side of said through passage nearest to a closed end of said hook body.

7. The hook assembly according to claim 1, wherein said hook body comprises a grab hook, and said hook opening is an elongate receiving slot with a narrow, straight-sided throat.

8. The hook assembly according to claim 1, wherein said hook body comprises a slip hook, and said hook opening comprises a wide throat that allows items retained in the hook opening to slide freely through the hook.

9. The hook assembly according to claim 1, wherein said base of the hook body comprises a weldable chamfer edge on a side of the base opposite from said hook opening to facilitate welding the hook body to a structure for use as a weld-on attachment point.

10. The hook assembly according to claim 1, wherein said pin assembly comprises a means for locking said pin assembly in a position with the pin member received in said through passage substantially closing the open side of said hook opening.

11. In combination, a structure with a weld-on hook assembly, comprising:

a hook body having a shank portion and a free end portion disposed in a common plane with a closed end of the hook body defined between said shank portion and said free end portion, and a hook opening defined by said shank portion and said free end portion having an open side facing away from said closed end, said hook opening being arranged for receiving an item to be engaged by said hook assembly, said shank portion having a weldable base on a side opposite from said hook opening, said base being welded to the structure to allow the hook assembly to be used as a weld-on attachment point on the structure;

said free end portion of the hook body having a tip end portion with a through passage comprising a key slot; and a removable pin assembly having a pin member received in said through passage to substantially close an open side of said hook opening to retain items within said hook opening, said pin member comprising a protrusion that mates with said key slot when the pin member is rotated to a first position to allow said pin member to be received in and removed from said through passage, and said protrusion serving as a locking structure that prevents said pin member from being removed from said through passage when said pin member is rotated away from said first position.

12. The combination according to claim 11, wherein said tip end portion extends further from said hook opening than said base, and said pin member extends through said passage generally perpendicular to said shank portion of the hook body with an end portion of said pin member adjacent to an end face of the base of said shank portion.

13. The combination according to claim 11, wherein said removable pin assembly comprises a lynch pin with a spring retainer arranged to bias said lynch pin to a rotational position away from said first position to prevent said lynch pin from being removed from said through passage.

14. The combination according to claim 11, wherein said hook body comprises a grab hook, and said hook opening is an elongate receiving slot with a narrow, straight-sided throat.

15. The combination according to claim 11, wherein said hook body comprises a slip hook, and said hook opening comprises a wide throat that allows items retained in the hook opening to slide freely through the hook.

16. A weld-on hook assembly, comprising:

a hook body having a shank portion and a free end portion disposed in a common plane and defining a hook opening for receiving an item to be engaged by said hook assembly, said shank portion having a weldable base to allow the hook assembly to be used as a weld-on attachment point;

said free end portion of the hook body having a tip end portion with a through passage comprising a key slot; and a removable pin assembly having a pin member received in said through passage to substantially close an open side of said hook opening to retain items within said hook opening, said pin member comprising a protrusion that mates with said key slot when the pin member is rotated to a first position to allow said pin member to be received in and removed from said through passage, and said protrusion serving as a locking structure that prevents said pin member from being removed from said through passage when said pin member is rotated away from said first position;

wherein said removable pin assembly comprises a lynch pin with a spring retainer arranged to bias said lynch pin to a rotational position away from said first position to prevent said lynch pin from being removed from said through passage; and wherein said lynch pin comprises a head, said spring retainer comprises a generally circular spring having offset ends received in respective openings in said head, said spring retainer has a first released position in which the lynch pin can be rotated freely within the through passage, and a second closed position in which an intermediate portion of the spring retainer is held by spring force against an outer surface of the lynch pin and abutting portions of the spring retainer are arranged to abut respective sides of the free end portion of the hook body to prevent rotational movement of the lynch pin to said first position, and wherein said protrusion on said lynch pin is arranged to abut a periphery of the through passage in the tip end portion of the hook body when serving as a locking structure to prevent the lynch pin from being removed from said through passage when the lynch pin is rotated away from said first position.

17. A closure system, comprising:

a first element having a through passage with a key slot;

a removable lynch pin received in said through passage, said lynch pin comprising a protrusion that mates with said key slot when the lynch pin is rotated to a first position to allow said lynch pin to be received in and removed from said through passage, and wherein said protrusion serves as a locking structure that prevents said lynch pin from being removed from said through passage when said lynch pin is rotated away from said first position; and a spring retainer connected to said lynch pin and arranged to bias said lynch pin to a rotational position away from said first position to prevent said lynch pin from being removed from said through passage;

wherein said removable lynch pin comprises a head, said spring retainer comprises a generally circular spring having offset ends received in respective openings in said head, and said spring retainer has a first released position in which the lynch pin can be rotated freely within the through passage, and a second closed position in which an intermediate portion of the spring retainer is held by spring force against an outer surface of the lynch pin and abutting side portions of the spring retainer are arranged to abut respective sides of the first element to prevent rotational movement of the lynch pin to said first position.

* * * * *